(12) United States Patent
Williamson

(10) Patent No.: US 9,085,415 B2
(45) Date of Patent: Jul. 21, 2015

(54) CONVEYER BELT FOR ROUND PRODUCE

(71) Applicant: Robert L. Williamson, Hartford, MI (US)

(72) Inventor: Robert L. Williamson, Hartford, MI (US)

( * ) Notice: Subject to any disclaimer, the term of this patent is extended or adjusted under 35 U.S.C. 154(b) by 0 days.

(21) Appl. No.: 14/212,273

(22) Filed: Mar. 14, 2014

(65) Prior Publication Data

US 2014/0262692 A1 Sep. 18, 2014

Related U.S. Application Data

(60) Provisional application No. 61/787,012, filed on Mar. 15, 2013.

(51) Int. Cl.
*B65G 15/44* (2006.01)
*B65G 15/42* (2006.01)
*B65G 17/06* (2006.01)

(52) U.S. Cl.
CPC ............... *B65G 15/44* (2013.01); *B65G 15/42* (2013.01); *B65G 17/06* (2013.01); *B65G 2201/0211* (2013.01)

(58) Field of Classification Search
CPC .................. B65G 15/42; B65G 15/44; B65G 2201/0211; B65G 17/06
USPC ............................ 198/690.2, 698, 699.1, 850
See application file for complete search history.

(56) References Cited

U.S. PATENT DOCUMENTS

| 325,129 | A | * | 8/1885 | Stephens ....................... 209/433 |
| 656,644 | A | * | 8/1900 | Holland-Letz ................ 198/835 |
| 1,116,092 | A | * | 11/1914 | McIntire ....................... 209/433 |
| 6,371,280 | B1 | * | 4/2002 | Lindner ..................... 198/690.2 |
| 7,360,643 | B1 | * | 4/2008 | Fandella ....................... 198/850 |
| 7,827,028 | B2 | * | 11/2010 | Miller ............................... 704/2 |
| 2002/0175055 | A1 | * | 11/2002 | Ryde .............................. 198/847 |
| 2013/0168209 | A1 | * | 7/2013 | Fanshier et al. ............. 198/699.1 |

\* cited by examiner

*Primary Examiner* — Leslie A Nicholson, III
(74) *Attorney, Agent, or Firm* — R. Tracy Crump

(57) ABSTRACT

A conveyer belt having a plurality of raised crescent shaped protrusions extending upward from its flat body and arranged in an array of aligned vertical columns and horizontal rows. Each protrusion has rounded surfaces with no sharp edges, which helps prevent damage to produce as the produce falls upon the conveyer belt. The crescent shape of the protrusions along with the sloped and rounded surfaces form a plurality of pockets spaced and staggered across the conveying surface of the conveyer belt.

9 Claims, 13 Drawing Sheets

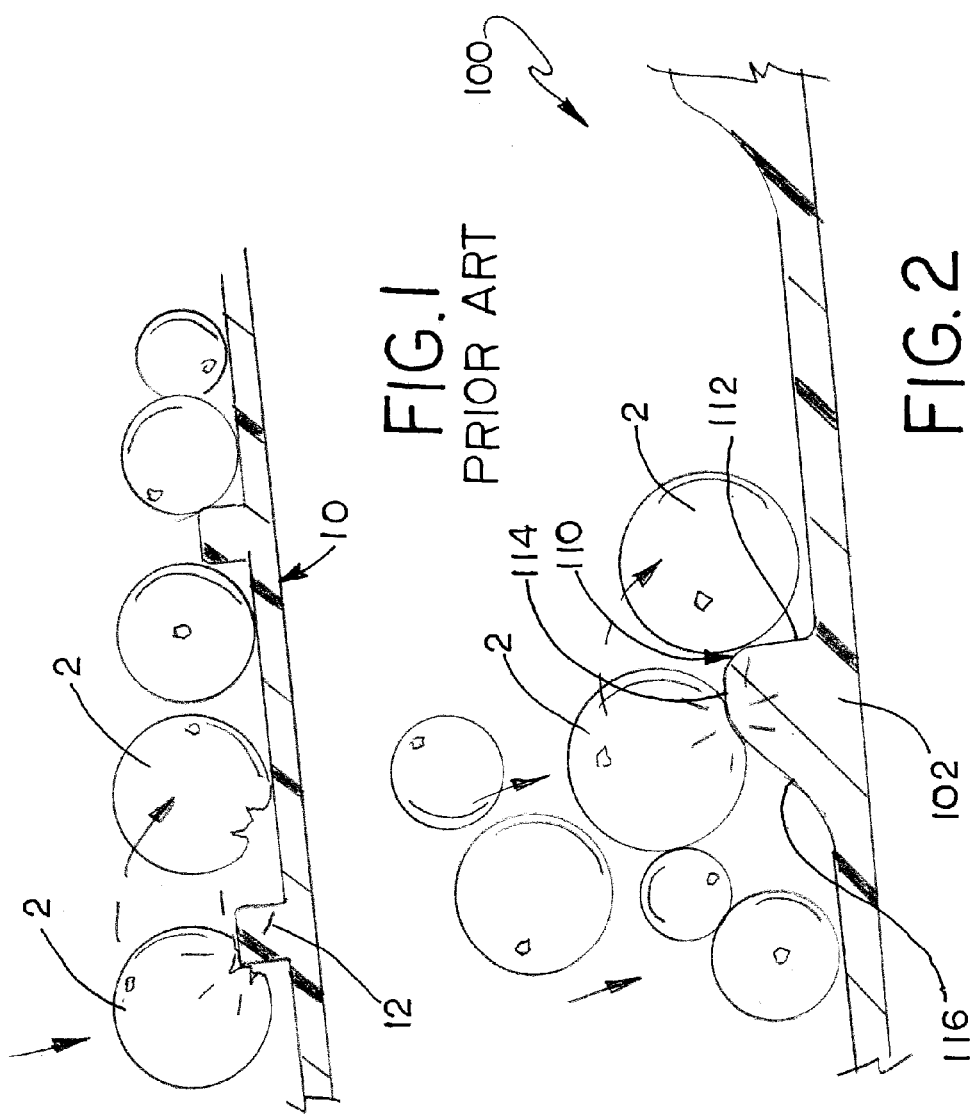

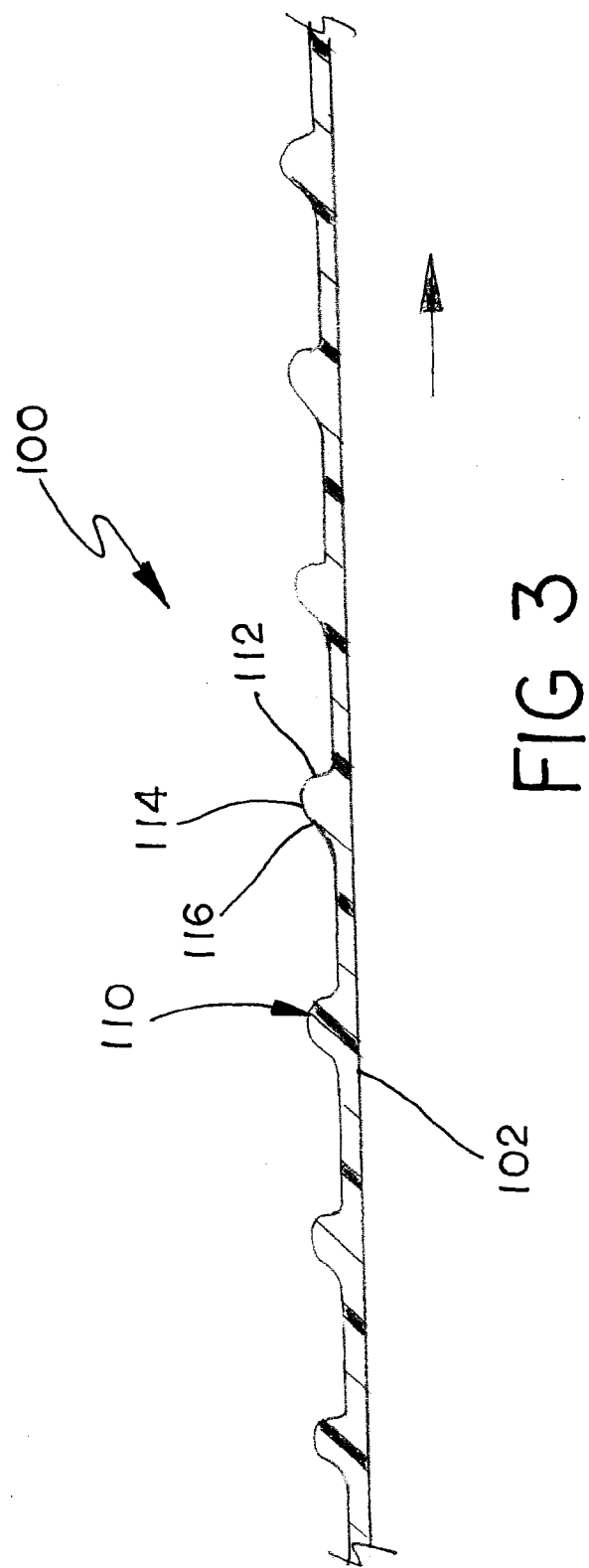

CONVEYER BELT FOR ROUND PRODUCE

This application claims priority from co-pending U.S. Provisional Patent Application Ser. No. 61/787,012 filed on Mar. 15, 2013, entitled "Conveyer Belt for Round Produce" which is hereby incorporated by reference.

This invention relates to conveyer belts for moving round produce, and in particular a conveyer belt for moving small, soft round produce, such as blueberries.

BACKGROUND OF THE INVENTION

Belt conveyer apparatus consist of a continuous flat belt trained about one or more rollers that transports materials or packages from one place to another. In the food and produce processing and packaging industries, conveyers are used to move all manner of produce between various processing and packaging stations. The continuous flat belts (conveyer belts) of a conventional belt conveyer apparatus have taken the form of a continuous durable cloth, rubber or polymer fabric or mat or a series of interlinked cross planks.

To accommodate moving greater volumes of produce and to move produce at inclines, conveyer belts often have an array of protrusions extending from the outer surface. Conventional conveyer belts used for moving produce have crescent shaped protrusions as shown in FIG. 1 of the accompanying drawings; however, the hard, sharp edges of conventional conveyer belt designs, frequently damage soft ripe produce, such as blueberries. In addition, conventional conveyer belt designs are unable to effectively move produce at inclines greater than twenty degrees without produce rolling back down the conveyer, referred to commonly as "roll-back."

SUMMARY OF INVENTION

The present invention provides an improved conveyer belt that has an array of protrusions configured and dimensioned to prevent damage to the soft round produce while preventing roll-back. The geometry and arrangement of the array of protrusions allows the conveyer belt to move round produce within the produce's particular size range at inclines up to 40 degrees. The protrusion has a round top surface that converges into a generally rounded convex leading surface and a generally concave trailing surface. The geometry of the cross sectional profile of the protrusion is selected so that all sizes of round produce, for which the conveyer belt is used, contacts a protrusion along its leading surface at a contact point between a protrusion midpoint and the flat top surface of the belt body. The geometry of the protrusion ensures that the round produce even of the largest size rests against the leading surface so that the center of gravity of the produce remains forward of the protrusion's midpoint even when the conveyer belt operates at inclines up to 40 degrees, thereby preventing roll-back over the protrusion.

The raised protrusions are crescent shaped and extending upward from the flat belt body and arranged in an array of aligned vertical columns and horizontal rows. Each protrusion has rounded surfaces with no sharp edges, which helps prevent damage to produce as the produce falls upon the conveyer belt. The crescent shape of the protrusion along with the sloped and rounded surfaces form a plurality of pockets spaced and staggered across the conveying surface of the conveyer belt. The arrangement of the array of protrusions and the spacing between the protrusions allows most small round produce to settle on the conveyer body between adjacent protrusions. The produce that settles between adjacent protrusions form a base layer of produce, which supports the additional layers of produce as the conveyer moves the entire volume of produce forward.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 1a is side sectional view of a portion of a conventional produce conveyer belt shown as prior art;

FIG. 2 is a side sectional view of a portion of an embodiment of the produce conveyer of this invention;

FIG. 3 is another side sectional view of a portion of the conveyer belt of FIG. 2;

DESCRIPTION OF THE PREFERRED EMBODIMENT

Figure 4:
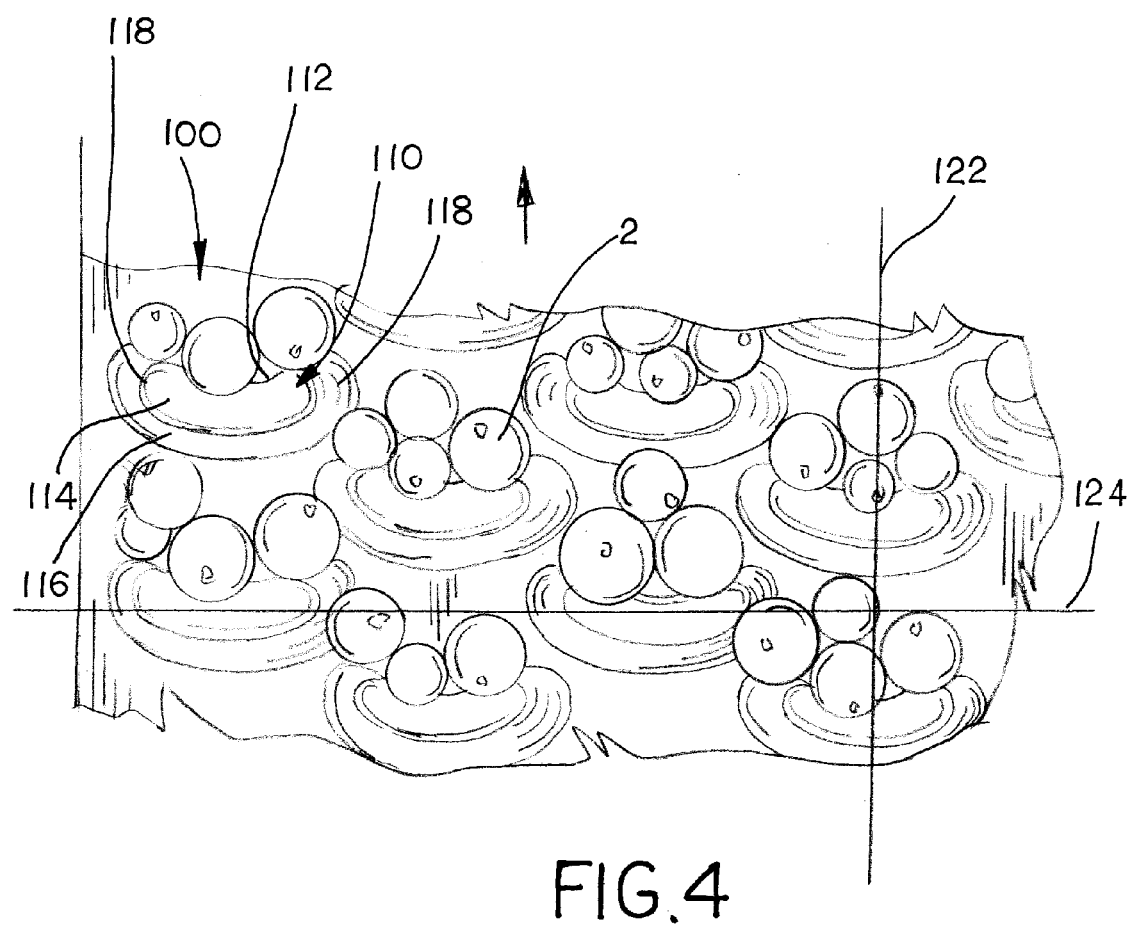
FIG. 4 is a partial top view of the conveyer belt of FIG. 2 showing the conveyer belt carrying a small number of blueberries.
Figure 5:
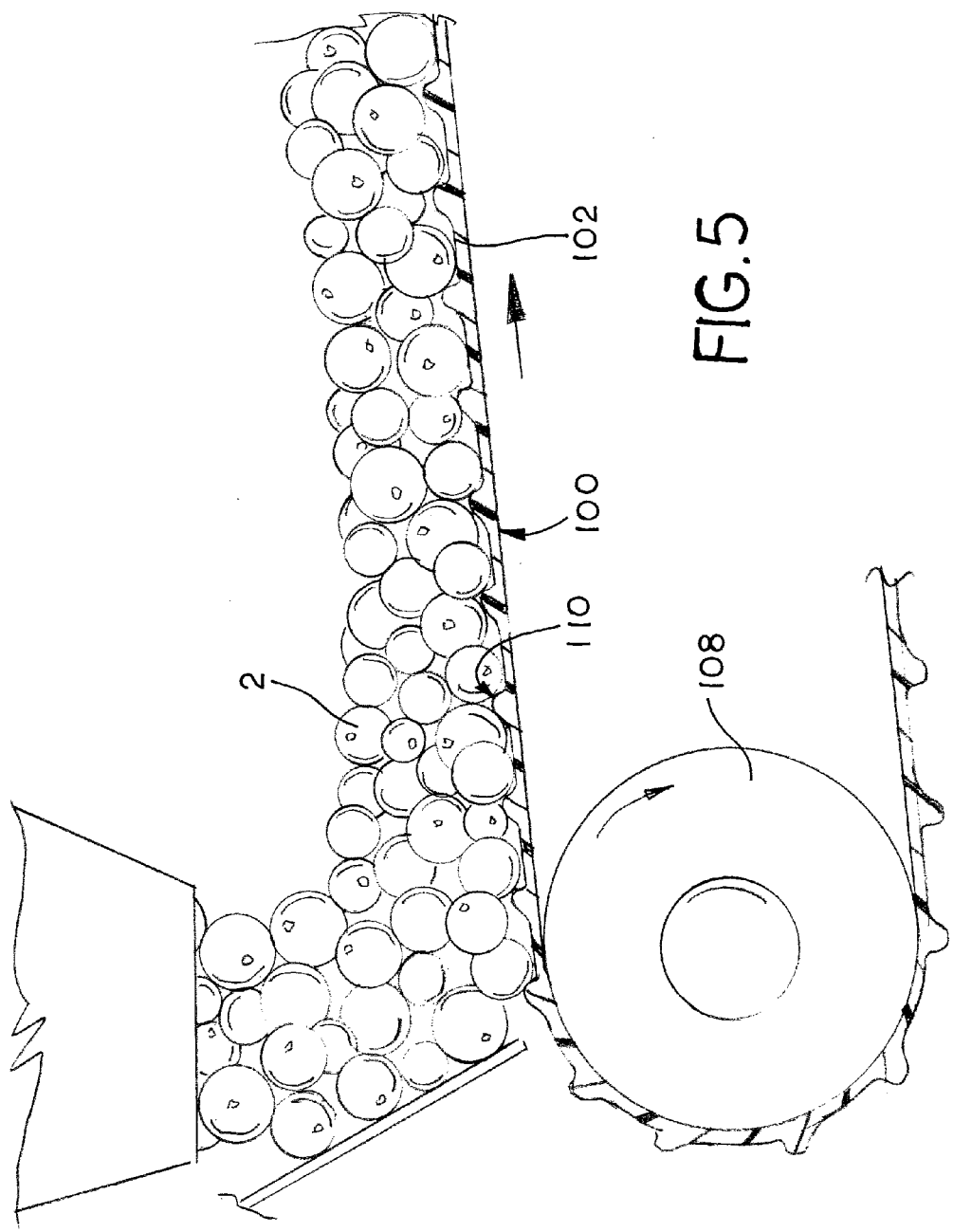
FIG. 5 is a side sectional view of a portion of a conventional conveyer assembly using the conveyer belt of FIG. 2 showing the conveyer belt carrying a typical volume of produce.
Figure 6:
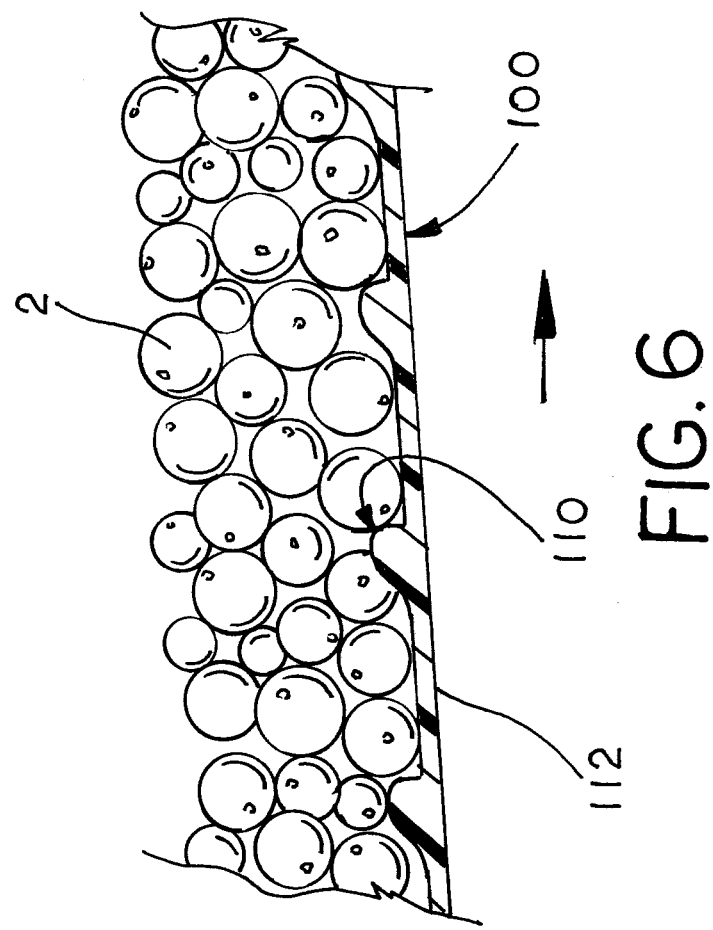
FIG. 6 is another side sectional view of a portion of the conveyer belt of FIG. 2 showing the conveyer belt carrying a typical volume of produce.
Figure 7:
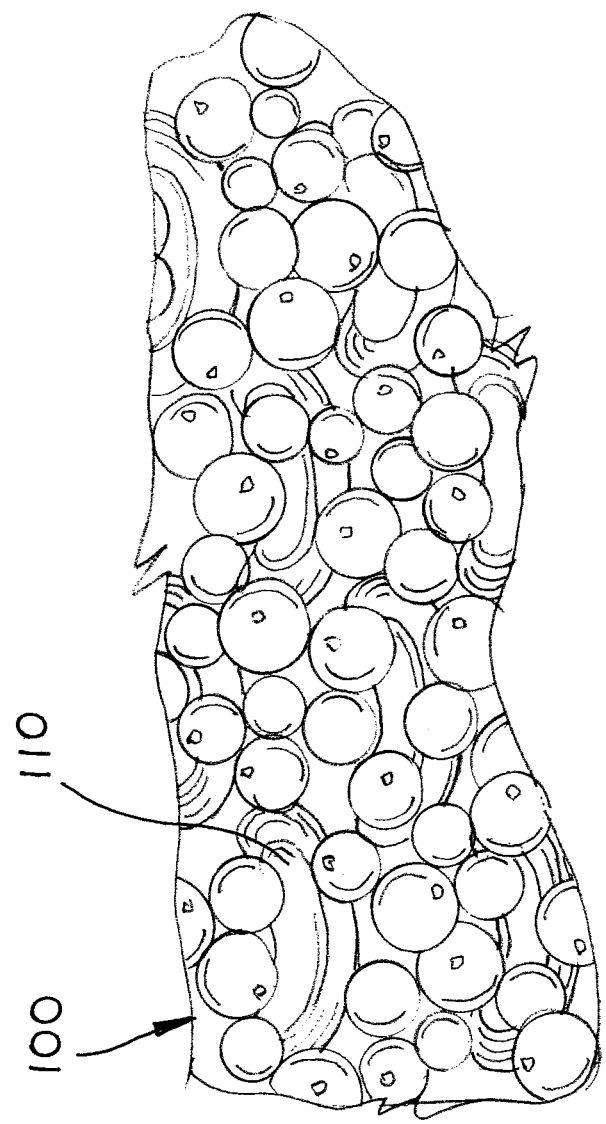
FIG. 7 is a partial top view of the conveyer belt of FIG. 2 showing the first layer of blueberries carried on the conveyer belt.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The conveyer belt of this invention is intended for use in moving round produce having a standardized size (grade) range, such as blueberries, cherries, cherry tomatoes and the like. The conveyer belt of this invention can move round produce within its particular size range at inclines up to 40 degrees without roll-back. Each embodiment of the conveyer belt of this invention is designed and intended to be used in conventional continuous looped belt conveyers, where the looped conveyer belt is trained about two or more rollers forming a conveying surface, which carries the produce. Such function and use of belt conveyer apparatus are well known and readily understood in the art.

In various embodiments, the conveyer belts of this invention may be adapted for moving any type of round produce. The embodiments of the invention depicted in the drawings and described below are adapted for use moving blueberries, but other embodiments may be adapted for use moving any round produce within the teachings of this invention. As with most produce, blueberries are available in a range of standardized sizes (grades), which for blueberries are based on the number of berries that will fill a cup measure. Generally, blueberries range in diameter size between 0.625 inches for the largest size or grade of berries and approximately 0.375 inches for the smallest size or grade of berries. A mean blueberry diameter is approximate 0.500 inches.

FIGS. 2-12 illustrate an embodiment of the conveyer belt of this invention, which is designated generally as reference numeral 100. As shown, conveyer belt 100 has an elongated planar conveyer belt body 102, which is generally molded formed or otherwise constructed from a fabric or fiber-reinforced rubber or polymer composite material. Opposed ends of conveyer belt body 102 are joined together mechanically or bonded together with adhesives to form a continuous loop (not shown).

As shown, conveyer belt 100 has an array of identical raised crescent shaped protrusions 110 extending from conveyer belt body 102. Protrusions 110 are arranged across the top surface 103 of conveyer belt body 102 in a spaced array, which forms staggered pockets of flat conveyer spaces between the protrusions across the conveying surface of conveyer belt 100. Each protrusion 110 has generally rounded surfaces with no sharp edges. The rounded and crescent shape protrusions 110 help prevent damage to produce as the produce falls upon conveyer belt 100.

Figure 8:
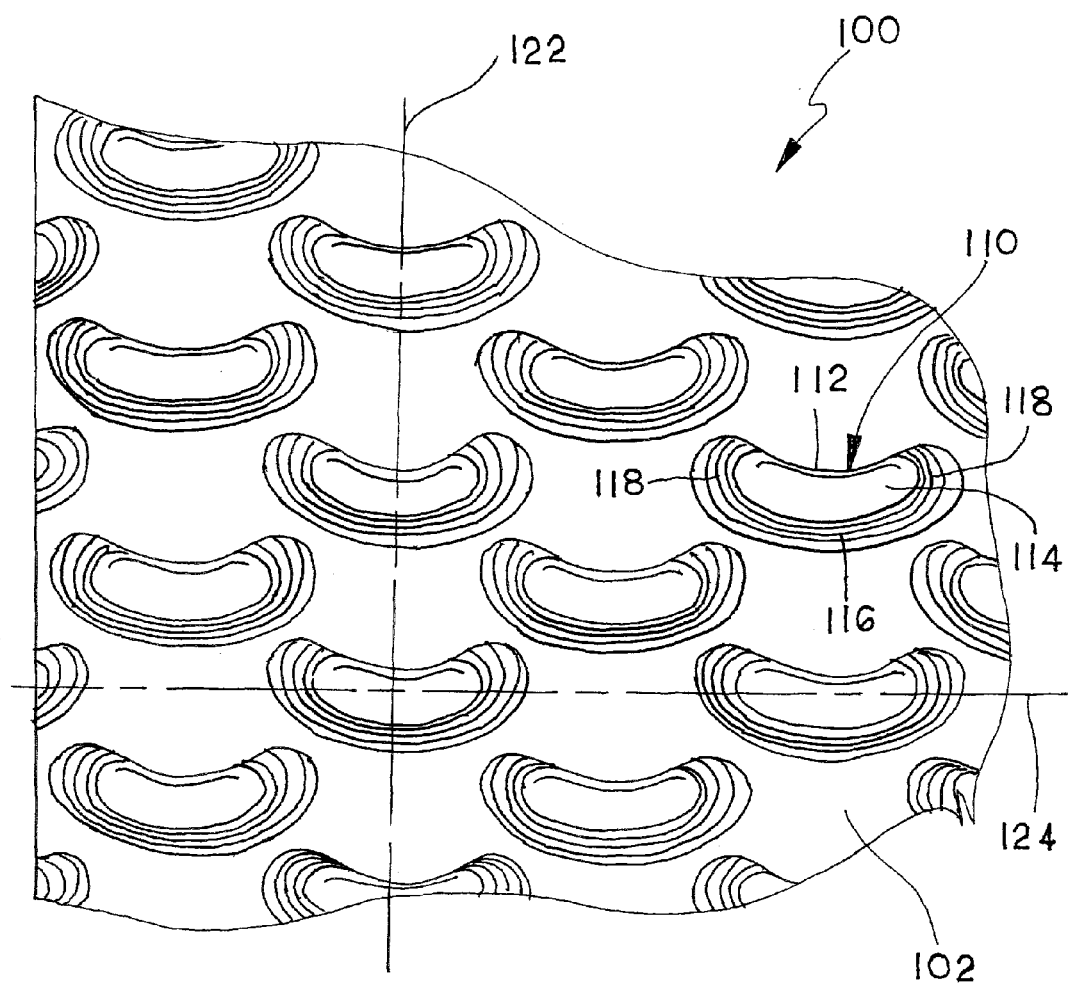
FIG. 8 is a partial top view of the conveyer belt of FIG. 2 showing the arrangement of the array of protrusions in spaced rows and columns.
Figure 9:
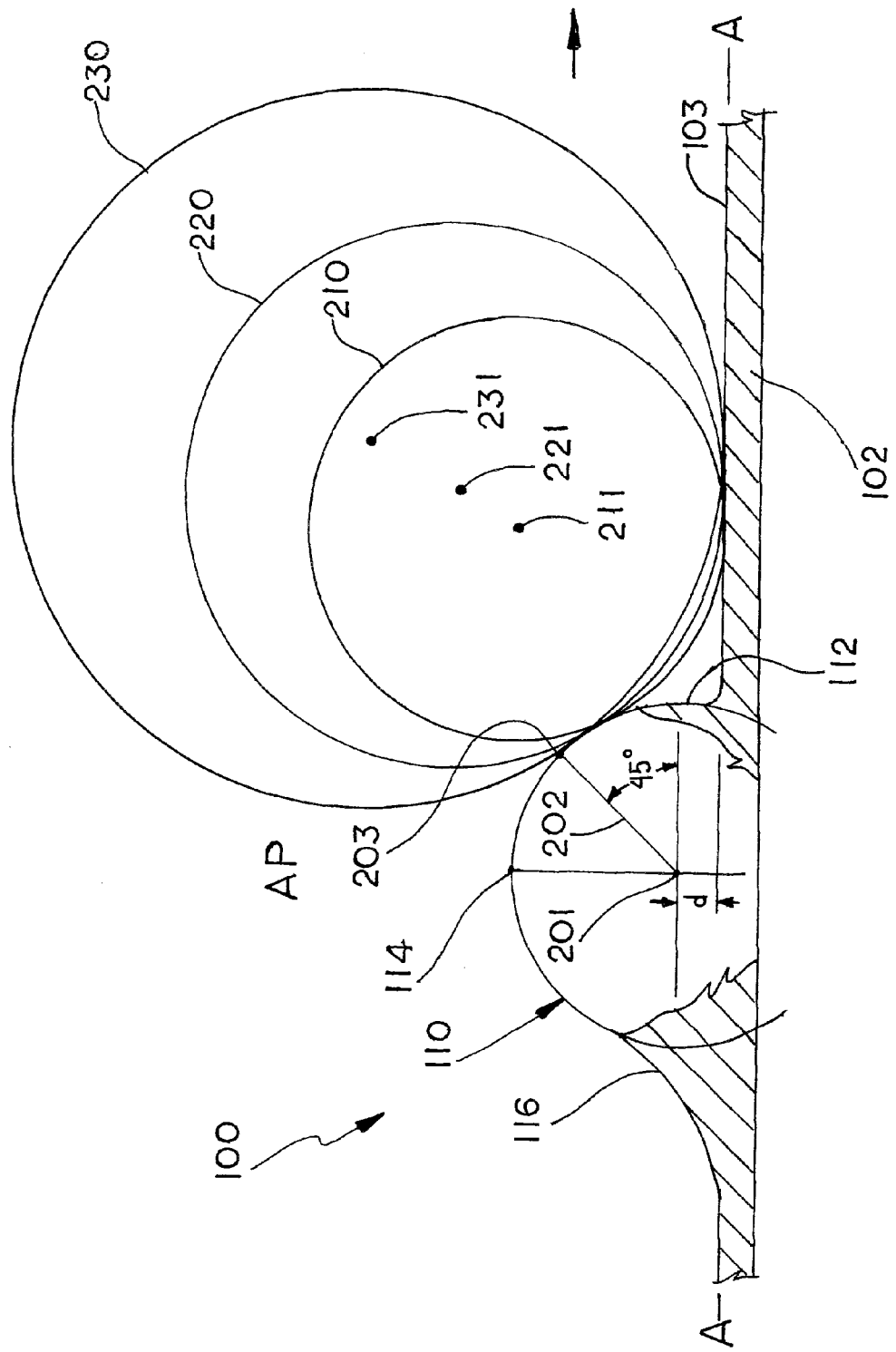
FIG. 9 is a simplified side profile view of the conveyer belt of FIG. 2 illustrating three sizes of round produce abutting the leading surface of the belt protrusion.
Figure 10:
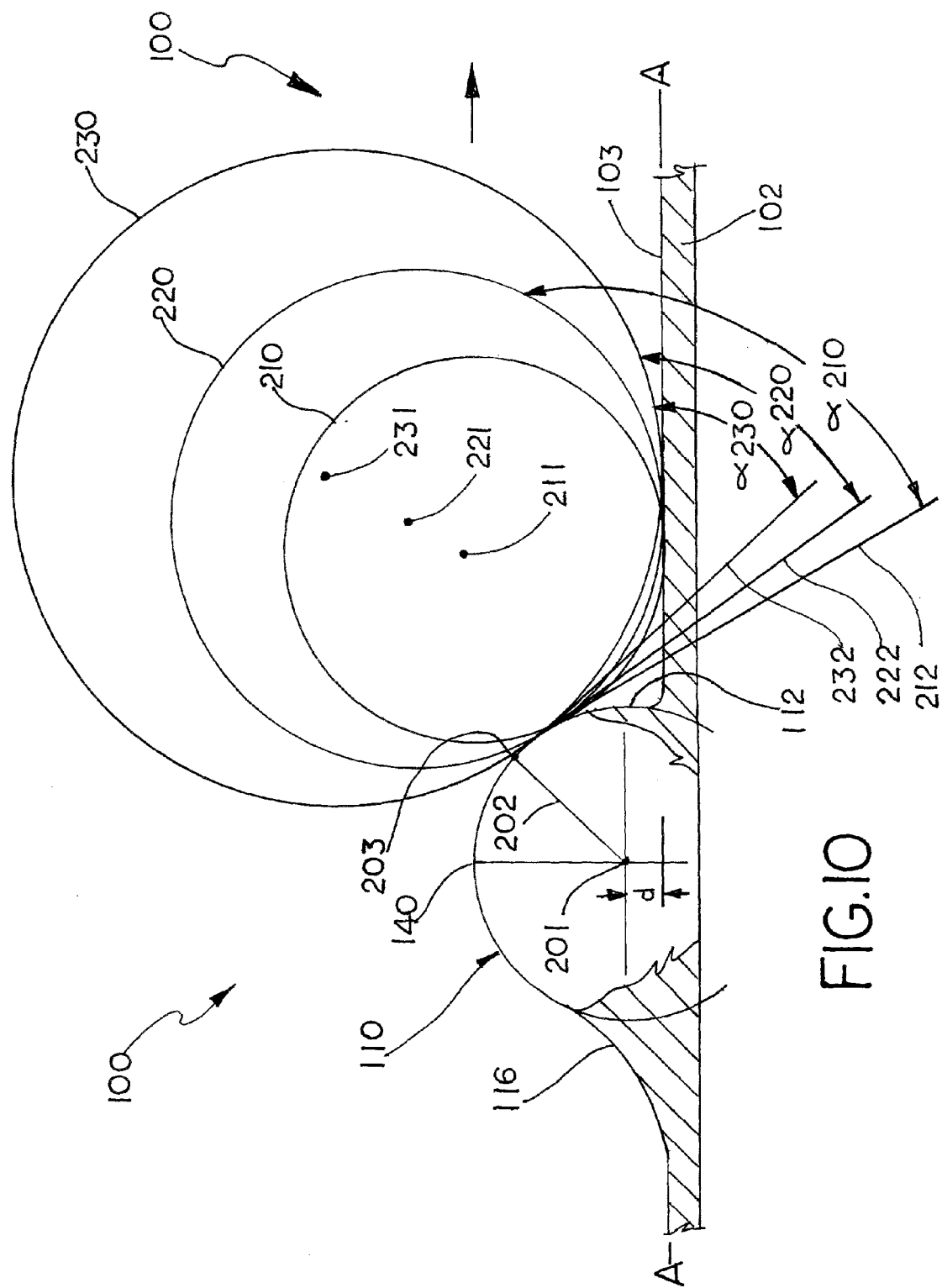
FIG. 10 is a simplified side profile view of the conveyer belt of FIG. 2 illustrating three sizes of round produce abutting the leading surface of the belt protrusion and showing the tangent lines to their respective contact points.

As best shown in FIG. 8, the array of protrusions 110 is generally arranged in aligned vertical (in the direction of produce movement with the conveyer apparatus) columns 122 and horizontal (transverse to the direction of produce movement with the conveyer apparatus) rows 124. Protrusions 110 in each column 122 and row 124 are spaced apart depending upon the particular produce for which the conveyer belt is used. The ends of adjacent protrusions in each row 124 slightly overlap the ends of adjacent protrusions 110 in adjacent columns 122. The arrangement of the array of protrusions 110 and the spacing between the protrusions typically allows the produce to settle on the flat belt surface 103 of conveyer body 102 between adjacent protrusions 110. The produce that settles between adjacent protrusions 110 form a base layer of produce, which supports the additional layers of produce as the conveyer moves the entire volume of produce forward (FIGS. 2, 4-7). A single piece of produce may settle between adjacent protrusions 110, but still provides the geometric matrix for supporting multiple layers of produce atop the base layer, without significant roll back (FIGS. 4-7).

The geometry of protrusion 110 is also selected so that the conveyer can operate at inclines up to 40 degree from horizontal while still conveying round produce of across its particular size range. Protrusion 110 has a round top surface 114 that converges into a generally rounded convex leading surface 112 and a generally concave trailing surface 116. The lateral end surfaces 118 of the crescent shaped protrusion 110 are rounded and contoured to merge smoothly into the flat outer surface 103 of conveyer belt body 102. Leading surface 112 is rounded but converges nearly perpendicularly into flat outer surface 103 of conveyer belt 102 with only a small curved transition at its base. Protrusions 110 are crescent shaped with the inner curvature following along the length of leading surface 112 having a radius approximately twenty percent (20%) greater than the diameter of the largest size (grade) of produce. The length of protrusions 110 is generally two to three times the diameter of the largest size of intended produce.

FIGS. 9-12 show an exemplary cross sectional profile of protrusion 110 with respect to different round produce sizes The curvature of leading surface 112 and crown surface 114 is formed by radius $P_r$ extending from a center point 201 that is spaced a distance d above the plane A-A of the flat top surface 103 of conveyer belt body 102. The radius 202 of leading surface 112 and crown surface 114 is selected to be less than twenty-five percent (25%) of the diameter of the largest size (grade of produce for with the conveyer belt is intended. In addition, distance d, the height that the center of protrusion 110 is spaced above the flat outer surface 103, is selected to be less than ten percent (10%) of the diameter of the largest size (grade) of produce for which the conveyer belt is intended.

Figure 11:
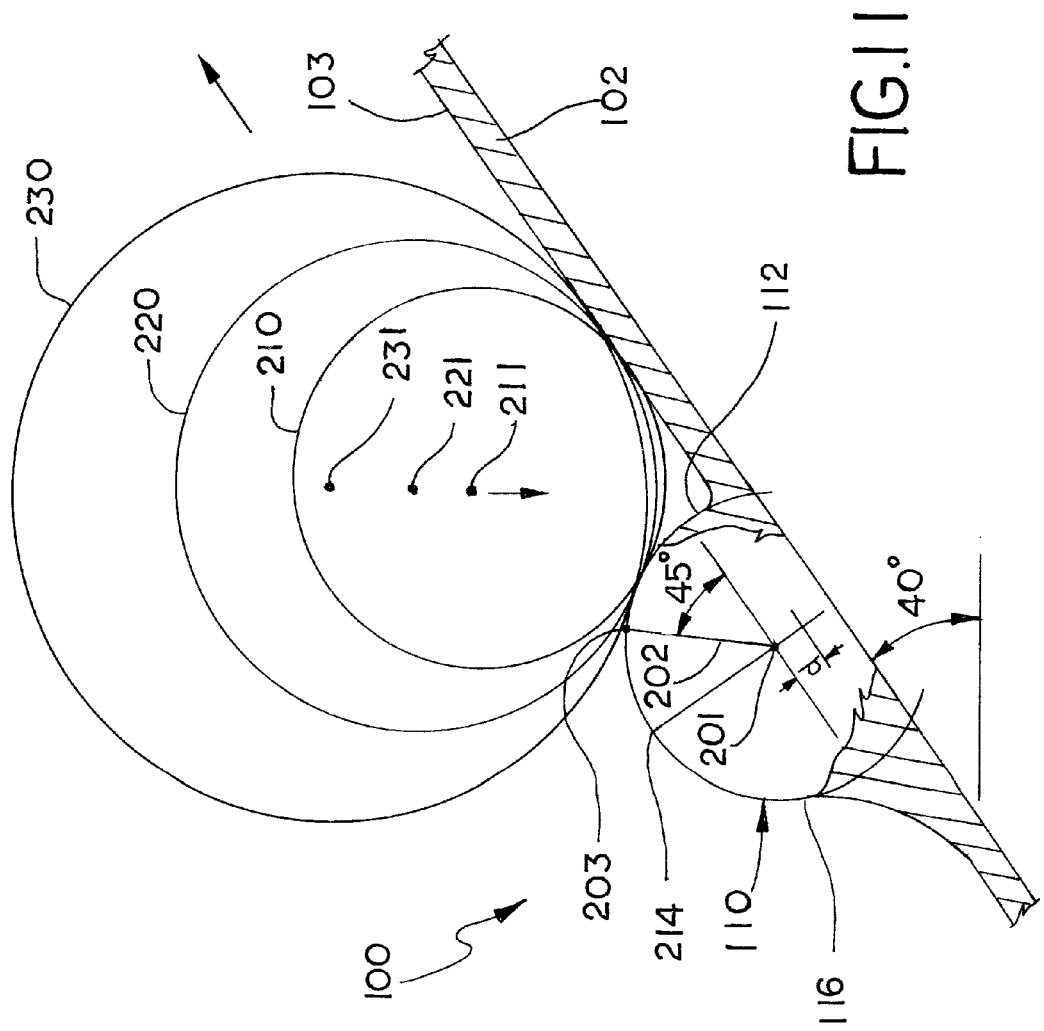
FIG. 11 is a simplified side profile view of the conveyer belt of FIG. 2 illustrating three sizes of round produce abutting the leading surface of the belt protrusion when the conveyer belt is operated at a forty degree incline.
Figure 12:
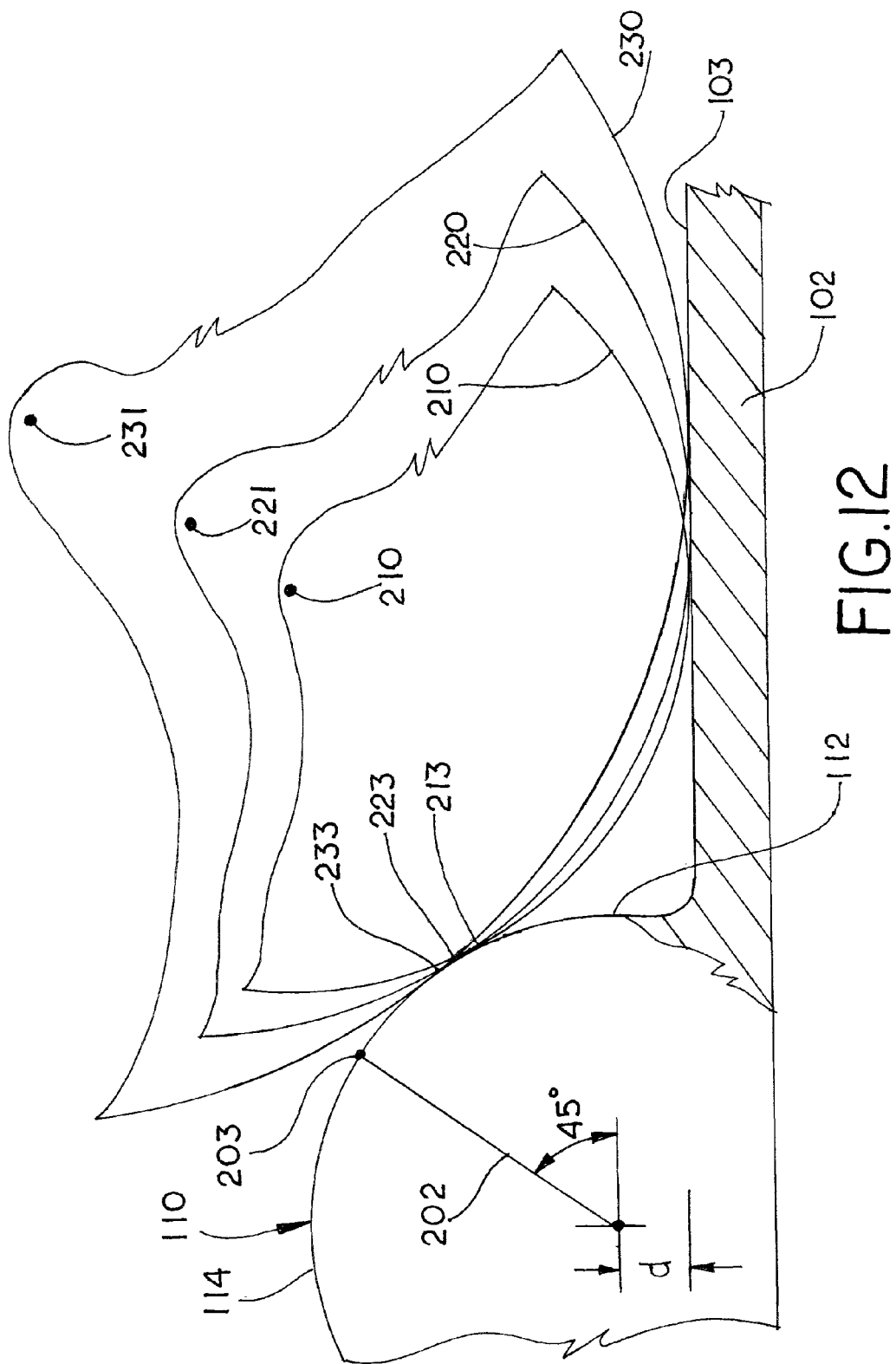
FIG. 12 is a partial side profile view of the conveyer belt of FIG. 2 illustrating the contact point along the leading surface of the belt protrusion for the three sizes of round produce of FIGS. 9-12.

As shown, the lead surface 112 has a midpoint 203 that is located at a tangential point 45° to plane A-A. The geometry of the cross sectional profile of protrusion 110 is selected so that all sizes of round produce, for which the conveyer belt 100 is used, contacts protrusions 110 along leading surface 114 at contact points between protrusion midpoint 203 and belt top surface 103. As shown, the largest produce 230 contacts leading surface 112 at contact point 233 where the tangent line 232 to its circumference is at an angle $\alpha_{230}$ approximately 58 degrees to plane A-A, but forward of midpoint 203. Similarly, the smallest produce 210 contacts leading surface 114 at contact point 213 where the tangent line 212 to its circumference is at an angle $\alpha_{210}$ approximately 65 degrees to plane A-A. An average size produce 220 contacts the leading surface at contact point 223, which is between contact points 213 and 233, where its tangent line 222 is at an angle between $\alpha_{210}$ and $\alpha_{230}$. For all sizes of round produce, the produce's center of gravity is always forward of mid point Pm even when conveyer belt 100 is operated at an incline up to 40 degrees (FIG. 11). Spacing center point 201 of protrusion 110 at distance d above plane A-A of conveyer belt body 102 provides additional contact surface along leading surface 114 so that the center of gravity of produce remains forward of protrusion midpoint 203 even if conveyer belt 100 is operated at an incline up to approximately 40 degrees (FIG. 11).

By way of example, conveyer belt 100 may be adapted for use with blueberries by configuring the protrusion geometry and array based on the generally established or standardized sizes (grades) of blueberries. In such a configuration, protrusions 110 are spaced in columns and rows approximately 1.0-1.50 inches apart and the ends of adjacent protrusions in each row 124 slightly overlap by approximately 0.25 of an inch the ends of adjacent protrusions 110 in adjacent columns 122. Also, protrusion 110 will have a radius 202 of approximately 0.150 inches and distance d is approximately 0.050 inches. The inner curvature following along the length of leading surface 112 will have a radius of approximately 0.750 inches. In this configuration, blueberries of all standard sizes will typically settle between adjacent protrusions 110 forming a bottom layer of berries that will support additional layers of berries as the conveyer moves the entire volume of berries (FIGS. 4-7).

Figure 13:
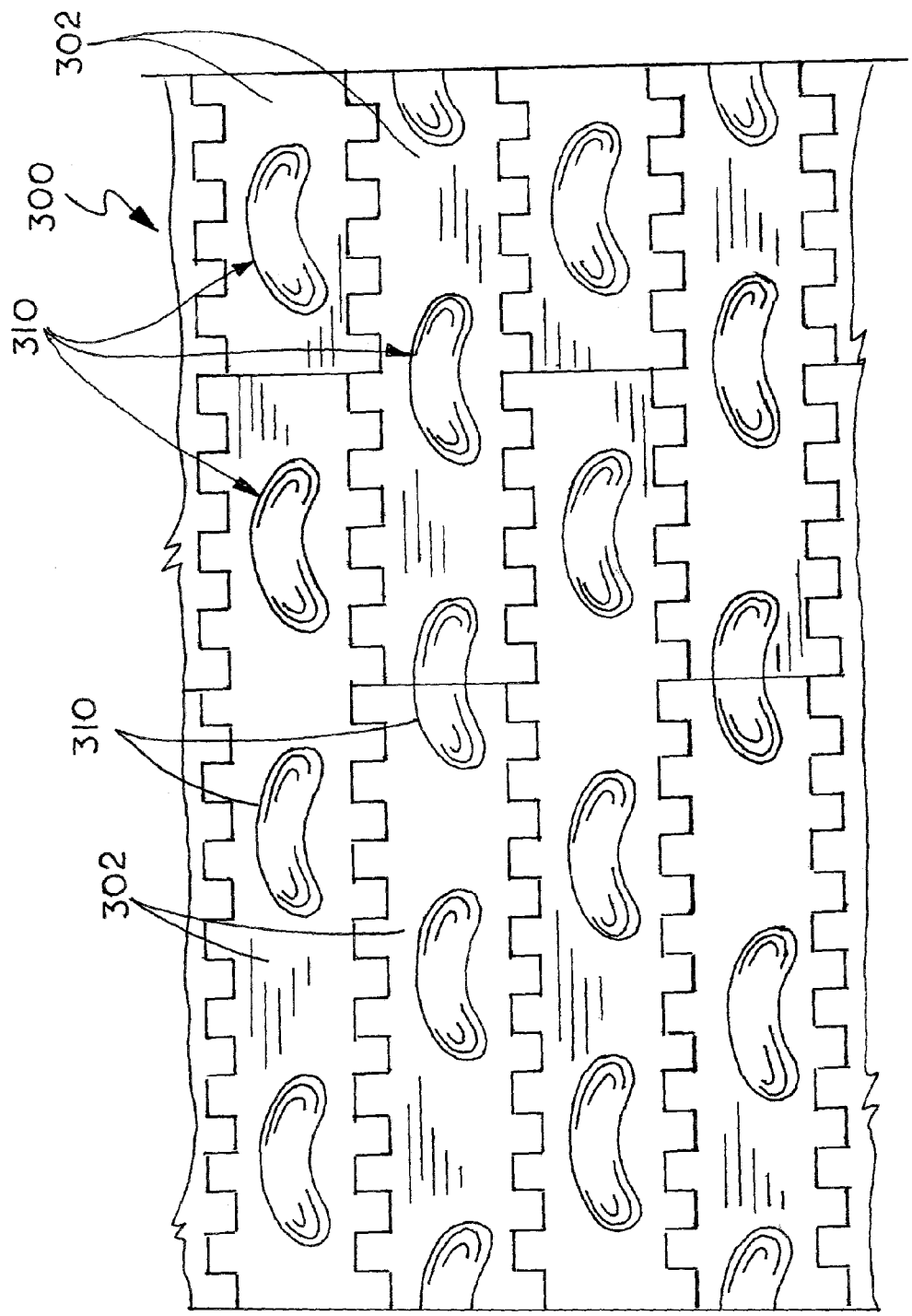
FIG. 13 is a partial top view of a second embodiment of the conveyer belt of this invention.
Figure 14:
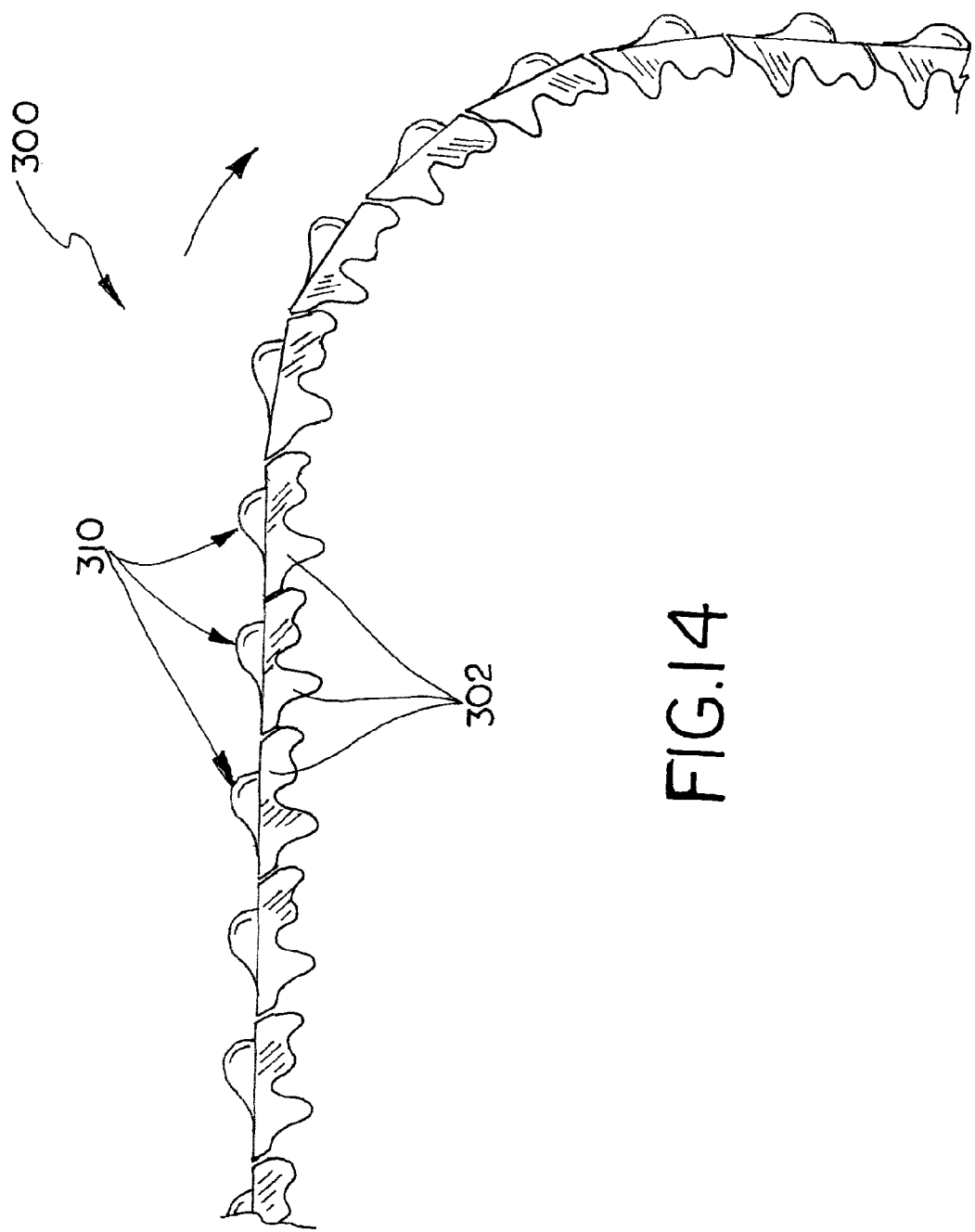
FIG. 14 is a partial side view of the conveyer belt of FIG. 13.

FIGS. 13 & 14 illustrate a second conveyer belt embodiment designated generally as reference 300. Conveyer belt 300 is similar to conveyer belt 100 in that its has an array of staggered and spaced protrusions 310. Conveyer belt 300 differs in the construction of the conveyer body. While conveyer belt body 102 was molded or formed as a continuous sheet having opposed ends connected to form the conveyer loop, Conveyer belt 300 is constructed from a plurality of individual conveyer planks or slats 302 interconnected to form an articulated conveyer loop. Slats 302 are interconnected using any structure or means that allows flexible articulated motion of the conveyer belt. As show, each slat has a plurality of protrusions 310 extending upward from its top surface. Protrusions 310 are located and spaced along the width of each slat to form the desired protrusion array as described above. In addition, the protrusion geometry and configuration of the protrusion array follow the same teachings as protrusions 110 as described above.

It should be apparent from the foregoing that an invention having significant advantages has been provided. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A conveyer belt for a conveyer apparatus for moving round produce having a known maximum size comprising:
    an elongated flat continuous belt body having a plurality of crescent shaped protrusion extending upward from the belt body and configured so that the conveyer belt moves the produce at inclines up to forty degrees from horizontal,
    each of the plurality of crescent shaped protrusions having rounded outer surfaces including a rounded leading surface, a trailing surface, a rounded top surface and opposed rounded ends,
    each of the plurality of protrusions having a center point spaced at a select distance above the longitudinal plane of the belt body, where the select distance is less than ten percent of the diameter of the known maximum size of the produce for which the conveyer belt is used,
    the top surface and leading surface having an outer curvature formed by a radius extending from the center point, where the radius is less than twenty-five percent of the diameter of the known maximum size of the produce for which the conveyer belt is used.

2. The conveyer belt of claim 1 wherein the leading surface of each of the plurality of protrusions has a mid point thereof that is located at a tangential point 45° to the longitudinal plane of the belt body such that the produce contacts the leading surface of each of the plurality of protrusions at a contact point forward of the midpoint and between the leading surface midpoint and the conveyer body when the conveyer belt moves the produce at inclines up to forty degree from horizontal.

3. The conveyer belt of claim 1 wherein the plurality of crescent shaped protrusions are spaced apart from one another in an array of overlapping columns and rows.

4. The conveyer belt of claim 1 wherein each of the plurality of protrusions has an inner curvature following along the length of the leading surface that has a radius approximately twenty percent (20%) greater than the diameter of the known maximum size of the produce for which the conveyer belt is used.

5. The conveyer belt of claim 1 wherein the length of each of the plurality of protrusions is between two to three times the diameter of the known maximum size of the produce for which the conveyer belt is used.

6. The conveyer belt of claim 1 wherein the belt body is formed of an elongated sheet member having opposed ends connected to form a continuous loop.

7. The conveyer belt of claim 1 wherein the belt body is formed by a plurality of interconnected and articulated planks, the plurality of protrusions extending upward from each of the plurality of planks.

8. A conveyer belt for a conveyer apparatus for moving round produce having a known maximum size comprising:
    an elongated flat continuous belt body having a plurality of crescent shaped protrusions extending upward from the belt body for moving the produce at inclines up to 40 degree from horizontal,
    the plurality of protrusions are spaced apart for one another in overlapping columns and rows across the belt body,
    each of the plurality of protrusions have rounded outer surfaces including a rounded leading surface, a trailing surface, a rounded top surface and opposed rounded ends, each of the plurality of protrusions also have a length between two to three times the diameter of the known maximum size of the produce for which the conveyer belt is used, have a center point spaced at a select distance above the longitudinal plane of the belt body, where the select distance is less than ten percent of the diameter of the known maximum size of the produce for which the conveyer belt is used, and have an inner curvature following along the length of the leading surface that has a radius approximately twenty percent (20%) greater than the diameter of the known maximum size of the produce for which the conveyer belt is used,
    the top surface and leading surface have an outer curvature formed by a radius extending from the center point, where the radius is less than twenty-five percent of the diameter of the known maximum size of the produce for which the conveyer belt is used,
    the leading surface of each of the plurality of protrusions has a mid point thereof that is located at a tangential point 45° to the longitudinal plane of the belt body such that the produce contacts the leading surface of each of the plurality of protrusions at a contact point forward of the midpoint and between the leading surface midpoint and the conveyer body when the conveyer belt moves the produce at inclines up to forty degrees from horizontal.

9. A conveyer belt for a conveyer apparatus for moving blueberries having a known maximum berry size comprising:
    an elongated flat continuous belt body having a plurality of crescent shaped protrusions extending upward from the belt body for moving the blueberries at inclines up to 40 degree from horizontal, the plurality of protrusions are spaced apart from one another in overlapping columns and rows across the belt body, each of the plurality of protrusions have rounded outer surfaces including a rounded leading surface, a trailing surface, a rounded top surface and opposed rounded ends, each of the plurality of protrusions also have a length between two to three times the diameter of the known maximum berry size of the blueberries, have a center point spaced at a select distance above the longitudinal plane of the belt body, where the select distance is less than ten percent of the diameter of the known maximum berry size of the blueberries, and have an inner curvature following along length of the leading surface that has a radius approximately twenty percent (20%) greater than the diameter of the known maximum berry size of the blueberries, the top surface and leading surface have an outer curvature formed by a radius extending from the center point, where the radius is less than twenty-five percent of the diameter of the known maximum berry size of the blueberries, the leading surface of each of the plurality of protrusions has a mid point thereof that is located at a tangential point 45° to the longitudinal plane of the belt body such that the blueberries contact the leading surface of each of the plurality of protrusions at a contact point forward of the midpoint and between the leading surface midpoint and the conveyer body when the conveyer belt moves the blueberries at inclines up to forty degrees from horizontal.

\* \* \* \* \*